United States Patent
Yamagata

[19]

[11] Patent Number: 6,088,024
[45] Date of Patent: Jul. 11, 2000

[54] TOUCH PANEL AND METHOD FOR DETECTING A PRESSED POSITION ON A TOUCH PANEL

[75] Inventor: Hideto Yamagata, Tokyo, Japan

[73] Assignee: NEC Corporation, Japan

[21] Appl. No.: 09/096,623

[22] Filed: Jun. 12, 1998

[30] Foreign Application Priority Data

Jun. 13, 1997 [JP] Japan ................................ 9-156921

[51] Int. Cl.⁷ ................................................ G09G 5/00
[52] U.S. Cl. ...................................... 345/173; 345/174
[58] Field of Search ................................. 345/173, 174, 345/175, 176, 177, 178, 179, 156, 157, 145, 146; 178/18.01, 18.1, 18.05

[56] References Cited

U.S. PATENT DOCUMENTS

| | | | |
|---|---|---|---|
| 4,954,967 | 9/1990 | Takahashi | 345/173 |
| 5,589,856 | 12/1996 | Stein et al. | 345/173 |
| 5,594,471 | 1/1997 | Deeran et al. | 345/173 |
| 5,793,303 | 8/1998 | Koga | 345/173 |
| 5,870,092 | 2/1999 | Bedford-Roberts | 345/173 |
| 5,945,973 | 8/1999 | Sakai et al. | 345/173 |

FOREIGN PATENT DOCUMENTS

| | | |
|---|---|---|
| 1318110 | 12/1989 | Japan . |
| 4337823 | 11/1992 | Japan . |
| 7182108 | 7/1995 | Japan . |
| 7334288 | 12/1995 | Japan . |
| 822358 | 1/1996 | Japan . |

OTHER PUBLICATIONS

Patent Abstract of Japan, Japanese Publication No. 8-022358, Jan. 23, 1996.
Patent Abstract of Japan, Japanese Publication No. 7-334288, Dec. 22, 1995.
Patent Abstract of Japan, Japanese Publication No. 7-182108, Jul. 21, 1995.
Patent Abstract of Japan, Japanese Publication No. 4-337823, Nov. 25, 1992.
Patent Abstract of Japan, Japanese Publication No. 1-318110, Dec. 22, 1989.

*Primary Examiner*—Xiao Wu
*Attorney, Agent, or Firm*—Ostrolenk, Faber, Gerb & Soffen, LLP

[57] ABSTRACT

In a resistive-film type touch panel having two resistive-film sheet, a first resistive-film sheet has a power supply means connected to it which generates in it a voltage gradient and the second resistive-film sheet detects a voltage which corresponds to a pressed position on the touch panel. Voltage information corresponding to pressed position coordinate values detected from the two resistive-film sheet is transferred to an A-D conversion means via a switching means for determination of the pressed position on the panel. A non-display region of the panel is provided with function keys, and the panel is additionally provided with a notification means and a non-display region pressing detection means, the notification means making notification of the output from the non-display region pressing detection means, which indicates that the non-display region has been pressed, without intervention of the analog-digital conversion means, directly to a processing/control circuit.

13 Claims, 9 Drawing Sheets

TOUCH PANEL AND METHOD FOR DETECTING A PRESSED POSITION ON A TOUCH PANEL

BACKGROUND OF THE INVENTION

1. Field of the Invention

The present invention relates to a touch panel in an information processing apparatus, and more specifically to a circuit configuration of a touch panel that detects the coordinates of a position pressed on a touch panel, and yet more specifically to an analog-type touch panel that uses a resistive film and a method of detecting the coordinates of a pressed position on the touch panel.

2. Description of Related Art

In the past, this type of touch panel circuit in a computer was used as a circuit to provide a simple input means which was fitted over the display apparatus. As one means of improving ease of operation and simplifying the apparatus, a touch panel having a larger surface area than the display region of the display apparatus was used, the part of the touch panel that fell outside of the display region being divided into a number of subregions, these subregions taking the place of keyboard keys or pushbutton switches, so that when pressed, a specific function was executed, as would be executed by pressing a function key.

Existing configurations of an analog-type of touch panel include those which use a resistive film and those which make use of electrostatic capacitance. With a touch panel that uses a resistive film, two uniform resistive film are separated by a spacing by means of a minute spacer, so that when the resistive film is pressed, the resistive films make contact, resulting in a voltage gradient that is applied to one of the resistive films being read as a voltage at the other resistive film.

FIG. 8 is a block diagram that shows an example of a touch panel circuit of the past.

The touch panel circuit 1 of FIG. 8 is made up of an A-D converter (ADC) 11 that has its reference input voltage terminal 11b connected to a power supply voltage (VCC), a switch (switching means) 41 that connects the input 11a of the ADC 11 to either an electrode 31 of a resistive film 30 or to an electrode 21 of a resistive film 20 of the touch panel, a switching means 43 which switches on and off the connection between VCC and the electrode 21 of the resistive film 20, a switching means 44 that switches on and off the connection between VCC and the electrode 31 of the resistive film 30, a switching means 45 that switches on and off the connection between the electrode 32 of the resistive film 30 and ground (GND), a switching means 46 that switching on and off the connection between the electrode 22 of the resistive film 20 and ground, a CPU 12 that controls all of the above-noted switching means and the ADC 11, and a memory 13 into which is stored the voltage values read from the ADC 11 and the coordinate values derived from those voltage values.

The touch panel 2 is constructed so that when two transparent and uniform resistive films 20 and 30, which are spaced apart from one another by a minute spacer, are pressed so as to make contact with each other, a voltage gradient that is applied to one of the resistive films is read as a voltage at the other resistive film.

On the reverse side of the display region of the touch panel 2 is disposed a display apparatus such as a liquid-crystal display. The subregions 51 of outside the display region each have assigned to them a function key.

The operation of the touch panel circuit of the past is described below.

FIG. 9 is a flowchart which shows an example of the operation of the touch panel circuit of the past which is shown in FIG. 8.

First, the switching means 43 and switching means 46 for the purpose of reading the horizontal (X) coordinate of the pressed position are set to on, switching means 41 is connected to the a side, and other switching means are set to off (step SD1).

The ADC 11 is instructed to start an A-D conversion (step SD2), and when the A-D conversion has been completed (step SD3), the voltage value is read (step SD4), the voltage value is converted to a coordinate value (step SD5), and this is stored into the memory 13 (step SD6).

Next, the switching means 44 and switching means 45 for the purpose of reading the vertical (Y) coordinate of the pressed position are set to on, switching means 41 is connected to the b side, and other switching means are set to off (step SD7).

The ADC is instructed to start an A-D conversion (step SD8), and when the A-D conversion has been completed (step SD9), the voltage value is read (step SD10), the voltage value is converted to a coordinate value (step SD11), and this is stored into the memory 13 (step SD12).

Since both the X and the Y coordinate values of the pressed position are obtained at this point, a judgment is made as to whether the pressed position is within the display region (step SD13). If it is outside the display region, a further judgment is made as to in which subregion 51 is it located (step SD14), and the processing of the function key corresponding to that subregion 51 is performed.

In this manner, because the processing for the judgment of the pressed position on a analog-type of touch panel which uses resistive films is more complex than a judgment of keyboard input which is input as a digital value or pushbutton switch input, judgment for touch panel function key input requires more time than the time required for keyboard or pushbutton input.

Additionally, because the entire touch panel makes a conversion to coordinate values with some given quantizing accuracy, the resolution per unit length usable for such function as recognition of handwritten characters is reduced by to the extent of the existence of the part of the panel lying outside the display area.

For example, in the Japanese Unexamined Patent Publication (KOKAI) No. 1-318110, there is language which describes technology for changing the resolution per unit length or the coordinate detection region by changing the value or polarity of a voltage that is applied the electrode of a resistive film.

In the Japanese Unexamined Patent Publication (KOKAI) No. 7-182108, there is indicated a method of measuring, in a touch panel made from two opposing electrode sheets, the voltage at a pressed position via a capacitance.

However, because the voltage is measured via a capacitance, there were also the problems of the equipment and circuit becoming complex, and of needing to establish the timing of the measurement, resulting in the measurement requiring time to perform.

In a touch panel circuit of the past as noted above, because the judgment as to whether or not a pressed position is within the display region is only possible after both the X and Y coordinate values have been established, even outside the display region, where it is sufficient to merely discriminate several subregion, it is necessary to perform processing with the same resolution that is used for such functions as recognition of handwritten characters, thereby causing an unavoidable decrease in detection speed.

Additionally, because conversion to coordinate values is performed with a given quantizing accuracy over the entire touch panel surface, the resolution per unit length within the display region that is used for such functions as recognition of handwritten characters is lowered to the extent of the existence of the area outside the display region.

In view of the above-described drawbacks in the prior art, therefore, an object of the present invention is to provide a touch panel circuit that overcomes the drawbacks in the prior art, by reducing the detection time for function keys outside of the display area.

Yet another object of the present invention is to prevent a decrease in the resolution per unit length within the display area by the provision of function keys outside the display area.

SUMMARY OF THE INVENTION

To achieve the above-noted object, the present invention has the following described technical constitution.

Specifically, the present invention is a resistive film type touch panel that is configured by two resistive films that are disposed in opposition to one another with a minute spacing therebetween.

In this touch panel circuit, a power supply means is connected to a selected first resistive-film sheet for the purpose of generating a prescribed voltage gradient therealong, a second resistive-film sheet being provided for the purpose of detecting a voltage which corresponds to the pressed position on the touch panel.

Voltage information which corresponds to pressed position coordinate values detected from both the resistive-film sheets is transferred, via an appropriate switching circuit, to an analog-to-digital conversion means, which is controlled by an arbitrary processing/control circuit, at which analog-to-digital conversion means these voltage values are used as the basis for the establishment of the above-noted pressed position coordinate values, the results being stored in an appropriate storage means.

A display region and a region outside of the display region are formed on this touch panel, which has prescribed function keys being disposed thereon in the region outside the display region, and which is also provided with a means for detecting that this non-display region has been pressed and a means for giving notification of the output of the detection means, without the intervention of the analog-digital conversion means.

In terms of a specific configuration of a touch panel according to the present invention, in a touch panel circuit according to the present invention, the above-noted object is achieved by a reference voltage generation means that has the maximum value of voltage of the display region, and a voltage comparison means which compares the voltage of the pressed position obtained from the resistive film on the detection side with this reference voltage, so that when the results of the comparison made by the comparison means are that the pressed position was in the non-display region (outside the display region), notification of this condition is made to the CPU as an interrupt signal, and the A-D converter full-scale reference voltage is made to coincide with the maximum voltage in the display region.

That is, a touch panel according to the present invention uses a resistive film type touch panel, and when the resistance value per unit length of this resistive film is uniform over the entire area thereof, by driving the electrodes at the two ends thereof with a fixed voltage, the voltage at a given position represents a divided voltage, the division being established by the distance of that position from the electrode, making it easy to derive the maximum voltage value in the display region from the distance from the display region edge.

By comparing the reference voltage power supply which has a voltage that is the maximum voltage value in the display region with the pressed position voltage that is obtained from the resistive film on the detection side, it is possible to directly detect that the non-display region has been pressed.

By supplying the full-scale reference voltage of the A-D converter from the above-noted reference voltage power supply, it is possible to use the A-D converter's full scale range in the display region, thereby preventing a decrease in the resolution per unit length within the display region that would have otherwise occurred because of the space region taken up by the function keys.

DETAILED DESCRIPTION OF THE PREFERRED EMBODIMENTS

Embodiments of a touch panel according to the present invention are described below, with reference being made to the relevant accompanying drawings.

Figure 1:
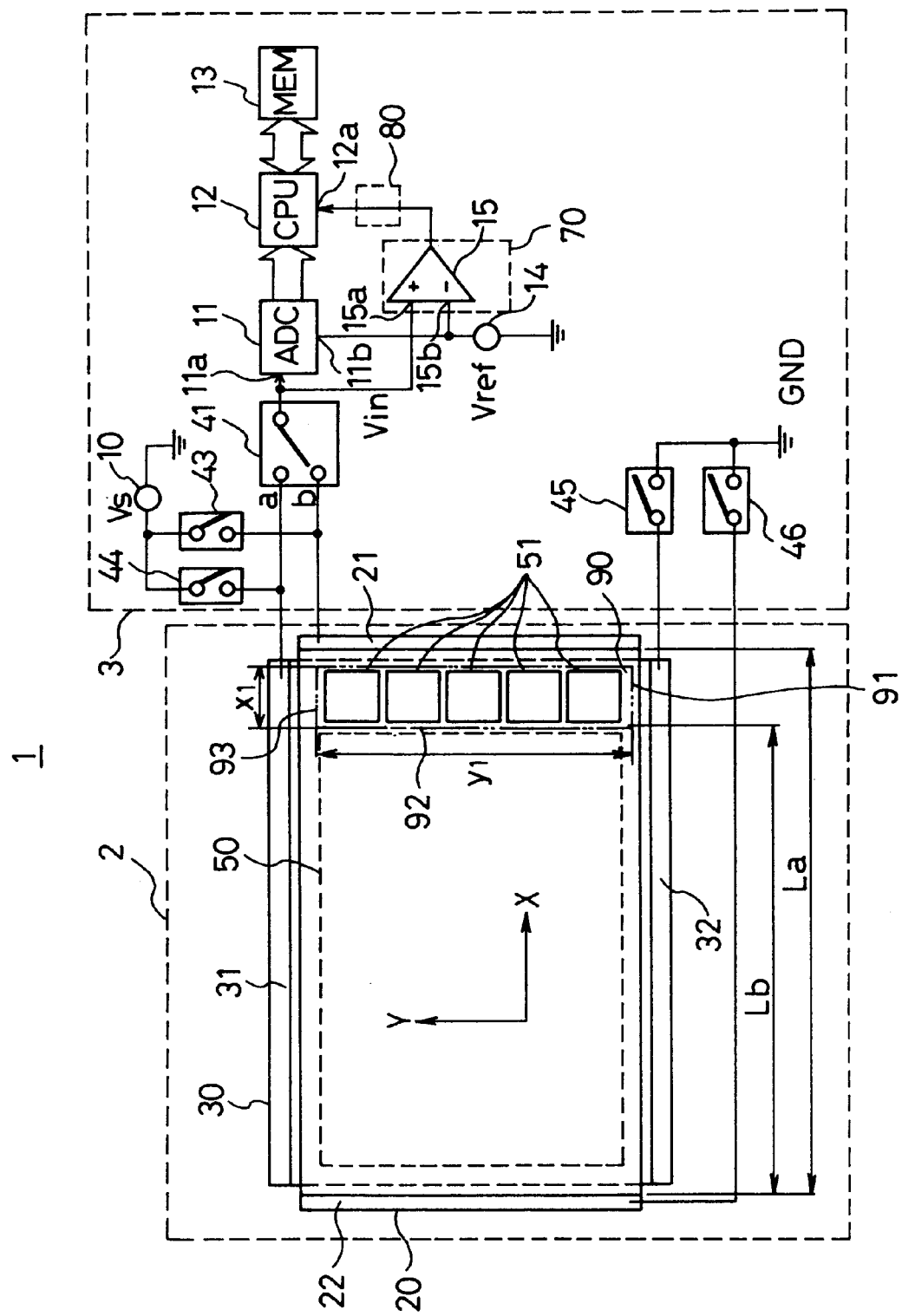
FIG. 1 is a block diagram which shows the configuration of the first embodiment of a touch panel according to the present invention.

Specifically FIG. 1 is a block diagram which shows the configuration of the first embodiment of a touch panel, in which is shown a resistive film type touch panel 1, which has the two resistive-film sheets 20 and 30, which are disposed so as to be in mutual opposition, with a minute spacing therebetween.

A prescribed power supply means 10, which generates a prescribed voltage gradient in the selected resistive-film sheet 20 is connected to the resistive-film sheet, the second resistive-film sheet 30 being provided so as to detect a voltage which corresponds to a pressed position on the touch panel 1.

Additionally, voltage information which corresponds to the pressed position that was detected from both of the resistive-film sheets 20 and 30 is transmitted, via an appropriate switching circuit 41, to an analog-digital conversion means 11 that is controlled by an arbitrary processing/control circuit 12, this analog-digital conversion means 11, based on the above-noted voltage, establishing the pressed position, the results being stored in a prescribed storage means 13.

The touch panel 1 has formed in it a display region 50 and a non-display region 90, the latter non-display region 90 having disposed on it function keys 51. Also provided are a non-display region pressing detection means 70, which detects that the non-display region 90 has been pressed, and a notification means 80, which makes notification of the output of the non-display region pressing detection means 70 directly to the processing/control circuit 11, without the intervention of the analog-digital conversion means 11.

In a touch panel according to the present invention, notification of an output signal from the non-display region pressing detection means, which indicates that the non-display region 90 has been pressed, is made to the processing/control circuit 12, using an interrupt signal.

Additionally, in the present invention the non-display region 60 an edge of a first coordinate axis (for example, the X axis) of the touch panel 1, is composed of a side part 91 that has a prescribed with x1 formed along the first coordinate axis and a side part 92 that has a prescribed width y1 formed parallel to a second coordinate axis, which is the second coordinate axis.

In the case in which there is detection of the pressing of the non-display region 60 in the direction of the first coordinate axis, with regard to a voltage value for the first coordinate axis direction at the position that was pressed, no analog-digital conversion is performed, an analog-digital conversion being performed only with regard to a voltage value for the direction of the second coordinate axis at the pressed position.

The above-noted operation is executed with the timing described below, using the opposite combination as noted above of the first resistive-film sheet and the second resistive-film sheet.

By way of describing an example of the operation of the touch panel according to the present invention in more detail, at a given point in time, the first resistive-film sheet, for example, the resistive-film sheet 20, is configured so as to have set onto it a prescribed voltage gradient in the direction of the first coordinate axis (for example, the X axis), and the second resistive-film sheet, for example, the resistive-film sheet 30, is configured so as to detect a voltage that corresponds to the pressed position in the direction of the first coordinate axis at that time.

At another point in time, the second resistive-film sheet, for example, the resistive-film sheet 30, is configured so as to have on it a prescribed voltage gradient in the direction of the second coordinate axis (for example, the Y axis), and the first resistive-film sheet 20 is configured so as to detect a voltage that corresponds to the pressed position in the direction of the second coordinate axis at that point in time.

In the present invention, either the first resistive-film sheet 20 or the second resistive-film sheet 30 is selected, the combinations of the switching means 43 and 46, 44 and 45, which are connected to the prescribed power supply 10, which is for the purpose of generating a voltage gradient in the selected resistive-film sheet, and either the selected first resistive-film sheet 20 or second resistive-film sheet 30 are selected, a voltage value for the pressed position on the resistive film sheet being detected, a second switching means 41 being provided for the purpose of connection to the A-D converter 11, the configuration being such that the first and second switching means operate alternately in mutual synchronization.

Next, an embodiment of a touch panel 1 according to the present invention will be described in detail, with reference being made to FIG. 1 and FIG. 2.

Specifically, as shown in FIG. 1, the touch panel 1 is formed by display region 2 and a controller 3 which executes control of the display region 2, this touch panel 1 having a fixed power supply 10 which supplies a fixed voltage to the pair of resistive-film sheets 20 and 30 which make up the touch panel, a second switching means 41 which connects a input terminal 11a of the A-D converter 11, the reference voltage input terminal of which is connected to a reference voltage power supply 14, to either an electrode 31 of one resistive film 30 of the touch panel or to an electrode 21 of the other resistive film 20 of the touch panel, a first switching means, which has a switching means 43 that switches on and off the connection between the fixed-voltage power supply 10 and the electrode 21 of the resistive film 20, a switching means 44 that switches on and off the connection between the fixed-voltage power supply 10 and the electrode 31 of the resistive film 30, a switching means 45 that switches on and off the connection between the electrode 32 of the resistive film 30 and ground (GND), and a switching means 46 that switches on and off the connection between the electrode 22 of the resistive film 20 and ground, a voltage comparator (CMP) 15 which compares the pressed position voltage with a reference voltage power supply 14 and which outputs an interrupt signal to the interrupt input terminal 12a of the CPU 12, a processing/control CPU 12 which controls all the switches and the A-D converter 11, and a memory 13, into which voltage values read from the A-D converter 11 and derived coordinate values are stored by the CPU 12.

As noted above, the voltage comparator 15 in FIG. 1 serves as the non-display region pressing detection means 70 in the present invention, the communication line from this voltage comparator 15 to the processing/control CPU 12 serving as the notification means in the present invention.

Additionally, the comparator 15 that serves as the non-display region pressing detection means 70 generates an output in the case in which the potential at the input terminal 15a thereof is higher than the potential at the input terminal 15b thereof.

In the touch panel 1, when the resistance per unit length in the resistive film 20 is uniform over its entire surface, if we let the distance from the electrode 21 to the electrode 22 of the resistive film 20 be La, the distance from the electrode 22 to the edge of the display region 50 that is closer to the electrode 21 be Lb, and the voltage of the fixed-voltage power supply 10 be Vs, with the switching means 43 on, so as to connect the electrode 21 to the fixed-voltage power supply 10, and the switching means 46 on, so as to connect the electrode 22 to ground (GND), the voltage at the edge of the display region 50, that is, the maximum voltage Vdmax in the display region 50, is expressed as Vdmax=Vs×Lb/La.

Additionally, with the switching means 44 and the switching means 45 off and the switching means 41 set to the a side, the voltage gradient generated in the resistive film 20 is detected via the resistive film 30 as a voltage which corresponds to the position pressed.

Under the above-noted conditions, if the voltage Vref of the reference voltage power supply 14 is set so as to be equal to the maximum voltage Vdmax in the display region 50, when the non-display region 90 is pressed, the condition Vin>Vref exists, so that the comparator 15 makes an output, resulting in an interrupt signal being input to the CPU 12.

In response to the above-noted interrupt signal, the CPU 12 can judge that the non-display region 90 had been pressed, so that the CPU 12 need not cause the A-D converter 11 to operate in order to perform a judgment of whether the pressed position was within the display region 50 or in the non-display region 90 by means of the coordinate values that are obtained from the voltage value therefrom, thereby shortening the detection time.

Figure 2:
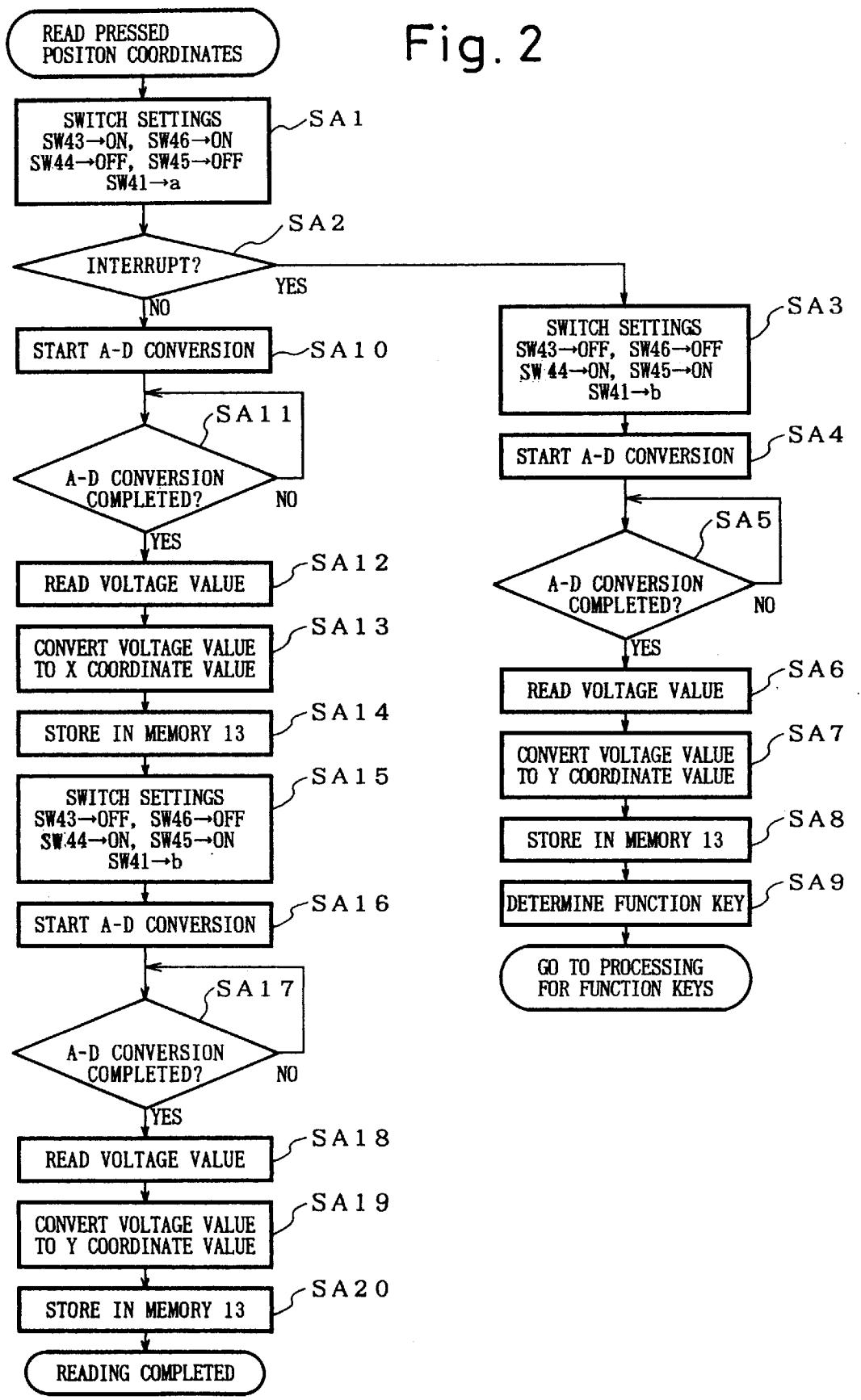
FIG. 2 is a flowchart which shows the operation in the first embodiment of the present invention, which is shown in FIG. 1.

FIG. 2 is a flowchart of the first embodiment of the present invention, which is shown in FIG. 1.

The operation will first be explained for the case in which the pressed position is within the display region.

The switching means 43 and switching means 46 are set to on so as to read the horizontal (X) direction coordinate value of the pressed position, and the switching means 44 and the switching means 45 are set to off, with the switching means 41 connected to the a side (step SA1).

Because in this case the pressed position is within the display region, the condition Vin<Vref exists, so that the voltage comparator 15 does not produce an output, resulting in no interrupt signal being input to the CPU 12 (step SA2). The result is that the A-D converter 11 is instructed to start an A-D conversion (step SA10) and, when the A-D conversion is completed (step SA11), the voltage value is read (step SA12), conversion is made from the voltage value to a coordinate value (step SA13), and this result is stored in the memory 13 (step SA14).

Additionally, to measure the vertical (Y) direction coordinate of the pressed position, the switching means 44 and the switching means 45 are set to on, the switching means 43 and the switching means 46 are set to off, and the switching means 41 is connected to the b side (step SA15).

The A-D converter 11 is instructed to start an A-D conversion (step SA16) and, when the A-D conversion is completed (step SA17), the voltage value is read (step SA18), conversion is made from the voltage value to a coordinate value (step SA19), and this result is stored in the memory 13 (step SA20).

Next, the operation in the case in which the pressed position is in the non-display region will be described.

In order to read the horizontal (X) direction coordinate value of the pressed position, the switching means 43 and the switching means 46 are set to on, the switching means 44 and the switching means 45 are set to off, and the switching means 41 is connected to the a side (step SA1).

Under the above-noted condition, since the pressed position is in the non-display region, the condition Vin>Vref exists, so that the voltage comparator 15 produces an output, this resulting in an interrupt to the CPU 12 (step SA2). The result is that, in order to read the vertical (Y) direction coordinate, the switching means 44 and the switching means 45 are set to on, the switching means 43 and the switching means 46 are set to off, and the switching means 41 is connected to the b side (step SA3).

Next, the A-D converter 11 is instruction to start an A-D conversion (step SA4) and, when the A-D conversion is completed (step SA5), the voltage value is read (step SA6), conversion is made from the voltage value to a coordinate value (step SA7), and the result is stored in the memory 13 (step SA8).

Then, a judgment with regard to the part of the subregion 90 is made from the Y-axis coordinate only (step SA9), the corresponding function key is determined from this result, and the processing for that function key is performed.

In this manner, by enabling a judgment to be made that the non-display region 90 has been pressed directly by means of an interrupt signal created from the output of the voltage comparator, that is, the non-display region pressing detection means 70, the need for the CPU 12 to cause the A-D converter 11 to operate so as to read a voltage value, the corresponding coordinate value from which used to make this judgment, is eliminated, thereby shortening the detection time.

While in this example, the non-display region 90 exists at the horizontal direction right side of the display region 50, in the case in which the non-display region 90 exists at the horizontal direction left side of the display region 50, the same operation is possible by reading the above description with the connections to the electrodes 21 and 22 of the resistive film 20 reversed, so as to generate a voltage gradient in the reverse direction.

Additionally, in the cases in which the non-display region 90 exists at the vertical direction top side of the display region 50 or at the vertical direction bottom side of the display region 50, it is possible to obtain the same operation by reading the above description with the vertical and horizontal directions interchanged.

In the present invention, the non-display region 90 can be can also be provided at both edges of the display region 50 in the first coordinate axis direction, in which case the non-display region pressing detection means 70 needs to have threshold values that are mutually different and which correspond to the separately formed non-display regions 90.

The non-display region 90 can be provided on either the first resistive film 20, the second resistive film 30, or on both resistive films 20 and 30.

As noted above, by making the full-scale reference voltage of the A-D converter 11 coincide with the maximum voltage value within the display region 50, there is an improvement in the resolution within the display region 50 compared with the resolution in the method of the past.

Summarizing the configuration and operation of this touch panel according to the present invention, in a touch panel circuit 1 used in a computer and having a power supply 10 which generates a voltage gradient on one resistive film of the resistive films 20 and 30, which are provided with a function key 51 region in the non-display region 90, switches 43, 44, 45, and 46, which select the resistive film to which the power supply is to be connected, an A-D converter 11 which converts the voltage at an electrode of a resistive film to a digital value, a switch 41 which selects an electrode of a resistive film to be connected to the input of the A-D converter 11, a non-display region pressing detection means 70 which senses when a pressed position is within the function key region of the non-display region 90 and which also notifies the CPU 12 of this fact, a CPU 12, and a memory 13, in the case in which information to the effect that the pressed position that was detected was in the non-display region 90 is received via a notification means 80, the processing/control circuit 12 performs the processing for the selected function key 51, but if the information of which notification was made by the notification means 80 is to the effect that the pressed position is within the display region 50, the processing/control circuit 12 performs processing to detect the coordinates of the pressed position.

Next, another embodiment of the present invention will be described, with reference being made to FIG. 3 and FIG. 4.

Figure 3:
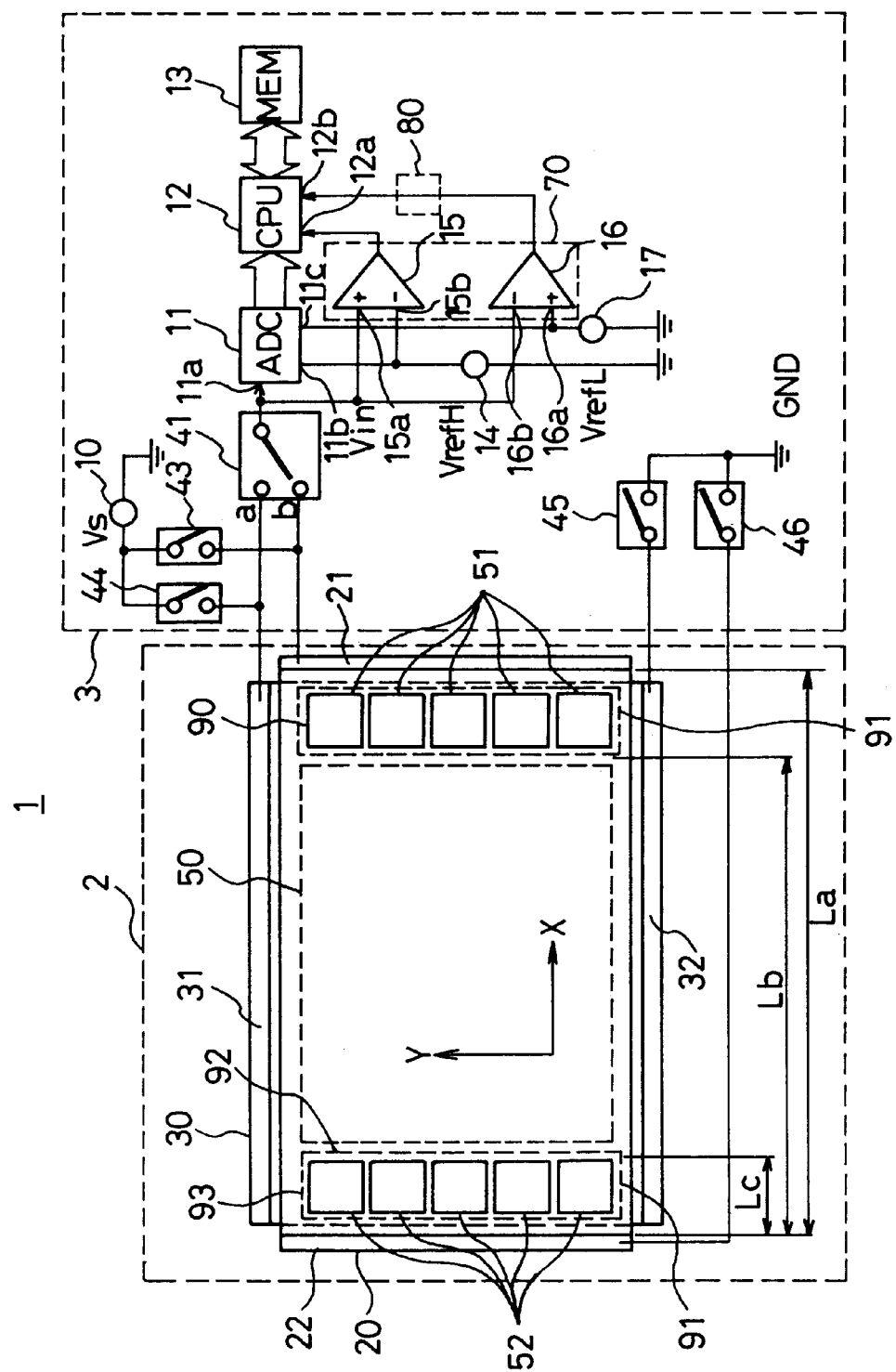
FIG. 3 is a block diagram which shows the configuration of the second embodiment of a touch panel according to the present invention,.

FIG. 3 is a block diagram of a touch panel 1 according to the present invention, in which the function key regions 90 and 93, which are located outside the display region, are disposed at both sides of the display region 50.

Specifically, the touch panel 1 has a fixed power supply 10 which supplies a fixed voltage to the pair of resistive-film sheets 20 and 30 which make up the touch panel, an A-D converter 11 having a reference voltage input terminal 11b that is connected to the reference voltage power supply 14 and a reference voltage input terminal 11c that is connected to another reference voltage power supply 16, and which performs quantizing between these two references voltages, a switching means 41 which connects a input terminal 11a of the A-D converter 11, to either an electrode 31 of one resistive film 30 of the touch panel or to an electrode 21 of the other resistive film 20 of the touch panel, a switching means 43 that switches on and off the connection between the fixed-voltage power supply 10 and the electrode 21 of the resistive film 20, a switching means 44 that switches on and off the connection between the fixed-voltage power supply 10 and the electrode 31 of the resistive film 30, a switching means 45 that switches on and off the connection between the electrode 32 of the resistive film 30 and ground (GND), a switching means 46 that switches on and off the connection between the electrode 22 of the resistive film 20 and ground, a voltage comparator (CMP) 15 which compares the pressed position voltage with a reference voltage power supply 14 and which outputs an interrupt signal to the interrupt input terminal 12a of the CPU 12, a voltage comparator (CMP) 16 which compares the pressed position voltage with a reference voltage power supply 17 and which outputs an interrupt signal to the interrupt input terminal 12b of the CPU 12, a processing/control CPU 12 which controls all the switches and the A-D converter 11, and a memory 13, into which voltage values read from the A-D converter 11 and derived coordinate values are stored by the CPU 12.

The voltage comparators 15 and 16 that serve as the non-display region pressing detection means 70 produce an output in the case in which the potential on the input terminal 15a or input terminal 16a is higher than the potential at the input terminal 15b or input terminal 16b, respectively.

In the touch panel 1, the position at which the resistive film 20 and the resistive film 30, which are transparent and uniform and which are kept at a prescribed spacing from one another by a minute spacer, make contact by being pressed, by means of a voltage gradient that is applied to one of the resistive film, this pressed position is detected as a voltage in the other resistive film.

On the reverse side of the display region 50 of the touch panel 1 is disposed a display apparatus such as a liquid-crystal display. The subregions 90 and 93 which are outside the display region each have assigned to them a function key.

In the touch panel 1, when the resistance per unit length in the resistive film 20 is uniform over its entire surface, if we let the distance from the electrode 21 to the electrode 22 of the resistive film 20 be La, the distance from the electrode 22 to the edge of the display region 50 that is closer to the electrode 21 be Lb, the distance from the electrode 22 to the edge of the display region 50 that is closer to the electrode 22 be Lc, and the voltage of the fixed-voltage power supply 10 be Vs, with the switching means 43 on, so as to connect the electrode 21 to the fixed-voltage power supply 10, and the switching means 46 on, so as to connect the electrode 22 to ground (GND), the voltage at the edge of the display region 50, that is, the maximum voltage Vdmax in the display region 50, is expressed as Vdmax=Vs×Lb/La, and the minimum voltage Vdmin in the display region 50 is expressed as Vdmin=Vs×Lc/La.

Additionally, with the switching means 44 off and the switching means 41 connected to the a side, the voltage gradient developed in the resistive film 20 is detected via the resistive film 30 as a voltage (Vin) that corresponds to the pressed position.

Under these conditions, by setting the voltage VrefH of the reference voltage power supply 14 to the maximum voltage Vdmax in the display region 50 and setting the voltage VrefL of the reference voltage power supply 17 to the minimum voltage Vdmin in the display region 50, in the case in which a subregion 90 outside the display region is pressed, the condition Vin>VrefH exists, so that the voltage comparator 15 produces an output, resulting in an interrupt signal being input to the interrupt signal input terminal 12a of the CPU 12.

However, in the case in which a subregion 93 outside the display region is pressed, the condition Vin<VrefL exists, so that the voltage comparator 16 produces an output, resulting in an interrupt signal being input to the interrupt signal input terminal 12b of the CPU 12.

Upon receipt of the above-noted interrupt signal, the CPU 12 judges that the pressed position was either the non-display region 90 or the non-display region 93, the result being, similar to the case of the previously describe first embodiment, that there is no need for the CPU to cause the A-D converter 11 to operate in order to perform a judgment of whether the pressed position was within the display region 50 or in the non-display region 90 by means of the coordinate values that are obtained from the voltage value therefrom, thereby shortening the detection time.

This embodiment of the present invention is described for the case in which the non-display regions exist at the left and right of the display region. However, the same type of operation can be achieved even in the case in which the non-display regions exist at the top and bottom of the display region, by interchanging the X direction and the Y direction in the foregoing description.

Figure 4:
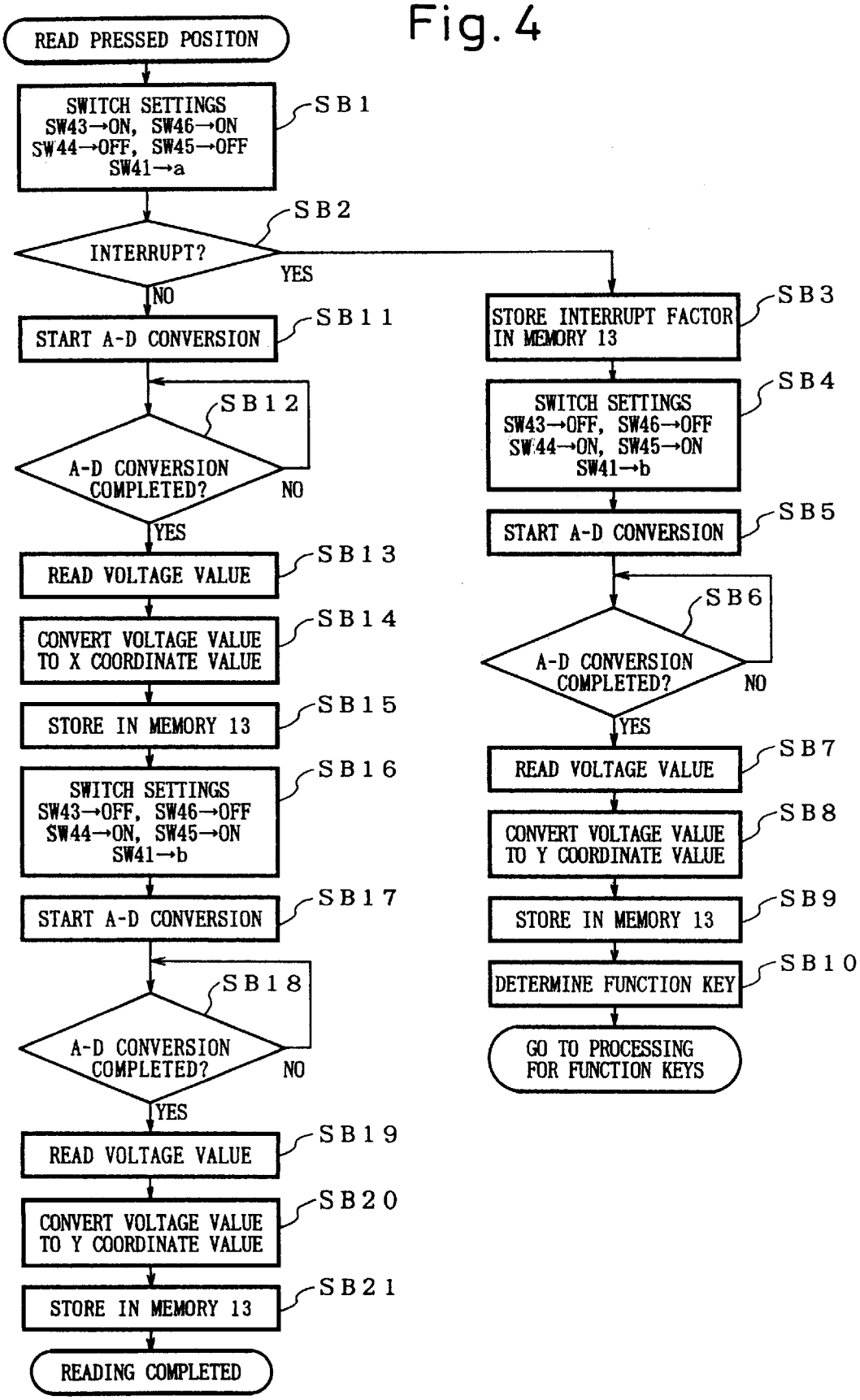
FIG. 4 is a flowchart which shows the operation of the second embodiment of the present invention, which is shown in FIG. 3.

FIG. 4 is a flowchart which shows the operation of the second embodiment.

The switching means 43 and switching means 46 are set to on so as to read the horizontal (X) direction coordinate value of the pressed position, the switching means 44 and 45 are set to off, and the switching means 41 is connected to the a side (step SB1).

If at this time the pressed position is the display region 90 that is outside the display region, the condition Vin>VrefH exists, so that the voltage comparator 15 produces an output, resulting in an interrupt signal being input to the CPU 12 from the terminal 12a thereof, but if the pressed position is the subregion 93 which is outside the display region, the condition Vin<VrefL exists, so that the voltage comparator 16 produces an output, resulting in an interrupt signal being input to the CPU 12 from the terminal 12b thereof (step SB2), the interrupt factor being stored in the memory 13 (step SB3), at which point in order to read the vertical (Y) direction coordinate, the switching means 44 and switching means 45 are set to one, the switching means 43 and switching means 46 are set to off, and the switching means 41 is connected to the b side (step SB4).

The A-D converter 11 is instructed to start conversion (step SB5) and, when the A-D conversion is completed (step SB6), a voltage value is read (step SB7), a conversion is made from the voltage value to a coordinate value (step SB8), and the result is stored in the memory 13 (step SB9).

Then, a judgment is made with regard to which of the subregions 90 and 93 had been pressed is made from the interrupt factor and the Y-axis value that had been stored in the memory 13 (step SB10), and the processing corresponding to the function key is performed.

In this manner, by making a direct judgment based on an interrupt signal derived from the output of a voltage comparator as to which of the regions 90 and 93 outside the display region the pressed position belonged, there is no need for the CPU 12 to cause the A-D converter 11 to operate in order to perform a judgment of whether the pressed position was within the display region by means of the coordinate values that are obtained from the voltage value therefrom, thereby shortening the detection time.

Figure 5:
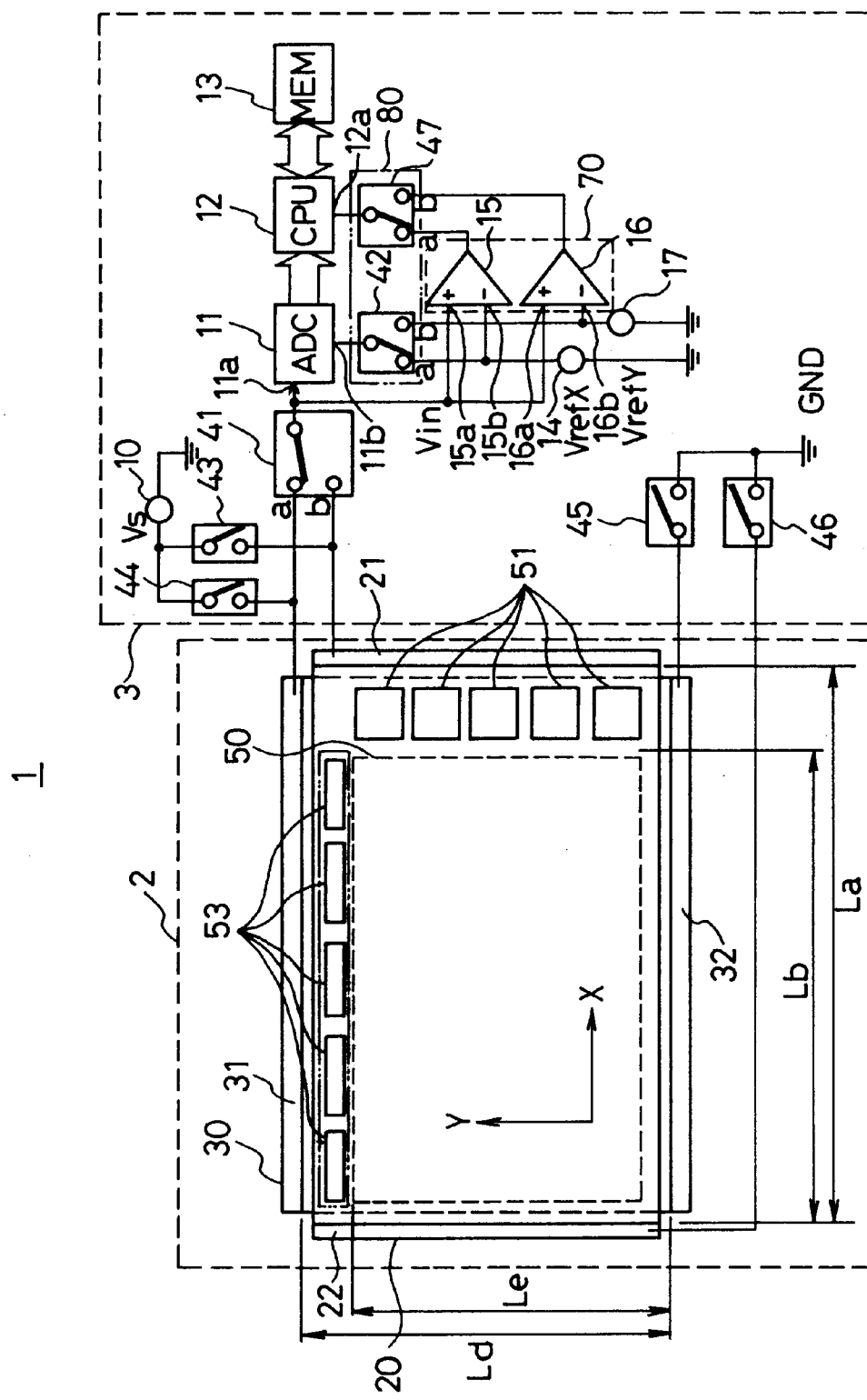
FIG. 5 is a block diagram which shows the configuration of the third embodiment of a touch panel according to the present invention.

FIG. 5 is a block diagram which shows an embodiment for the case in which function key regions outside the display region exist in the horizontal direction and the vertical direction edges of the display region 50.

Specifically, the touch panel 1 has a fixed power supply 10 which supplies a fixed voltage to a resistive-film sheet which makes up the touch panel, an A-D converter 11, a switching means 41 which connects a input terminal 11a of the A-D converter 11 to either an electrode 31 of the resistive film 30 of the touch panel or to an electrode 21 of the resistive film 20 of the touch panel 1, a switching means 42 which is operates in concert with the switching means 41, and which connects the reference voltage input terminal lib of the A-D converter 11 to either the reference voltage power supply 14 of the reference voltage power supply 17, a first switching means that has a switching means 43 that switches on and off the connection between the fixed-voltage power supply 10 and the electrode 21 of the resistive film 20, a switching means 44 that switches on and off the connection between the fixed-voltage power supply 10 and the electrode 31 of the resistive film 30, a switching means 45 that switches on and off the connection between the electrode 32 of the resistive film 30 and ground (GND), and a switching means 46 that switches on and off the connection between the electrode 22 of the resistive film 20 and ground, a voltage comparator (CMP) 15 which compares the pressed position voltage with a reference voltage power supply 14, a voltage comparator (CMP) 16 which compares the pressed position voltage with the reference voltage power supply 17, a switching means 47 which operates in concert with the switching means 41, and which connects the interrupt input terminal 12a of the CPU 12 to either the voltage comparator 15 or the voltage comparator 16, a CPU 12 which controls all the switches and the A-D converter 11, and a memory 13, into which voltage values read from the A-D converter 11 and derived coordinate values are stored by the CPU 12.

The voltage comparators 15 and 16 that serve as the non-display region pressing detection means 70 produce an output in the case in which the potential on the input terminal 15a or input terminal 16a is higher than the potential at the input terminal 15b or input terminal 16b, respectively.

In the touch panel 1, the position at which the resistive film 20 and the resistive film 30, which are transparent and uniform and which are kept at a prescribed spacing from one another by a minute spacer, make contact by being pressed, by means of a voltage gradient that is applied to one of the resistive film, this pressed position is detected as a voltage in the other resistive film.

On the reverse side of the display region 50 of the touch panel 1 is disposed a display apparatus such as a liquid-crystal display. The subregions 51 and 53 which are outside the display region each have assigned to them a function key.

In the touch panel 1, when the resistance per unit length in the resistive film 20 is uniform over its entire surface, if we let the distance from the electrode 21 to the electrode 22 of the resistive film 20 be La, the distance from the electrode 22 to the edge of the display region 50 that is closer to the electrode 21 be Lb, and the voltage of the fixed-voltage power supply 10 be Vs, with the switching means 43 on, so as to connect the electrode 21 to the fixed-voltage power supply 10, and the switching means 46 on, so as to connect the electrode 22 to ground (GND), the voltage at the edge of the display region 50, that is, the maximum voltage Vdxmax in the display region 50, is expressed as Vdxmax=Vs×Lb/La.

Additionally, with the switching means 44 and the switching means 45 set to off, and with the switching means 41 and the switching means 42 and 47, which form the communications means 80, set to the a side, the voltage gradient that is developed in the resistive film 20 is detected, via the resistive film 30, as a voltage (Vin) that corresponds to the pressed position.

Under the above conditions, by setting the voltage VrefX of the reference voltage power supply 14 to be equal to the maximum voltage Vdxmax in the display region 50, in the case in which a subregion 90 which is outside the display region is pressed, the condition Vin>VrefX exists, so that the voltage comparator 15 produces an output, the resulting being that an interrupt signal is input to the interrupt signal input terminal 12a of the CPU 12.

Additionally, if the resistance per unit length in the resistance film 30 in the touch panel 1 is uniform over the entire surface, if we let the distance from the electrode 31 to the electrode 32 of the resistive film 30 be Ld, let the distance from the electrode 32 to the edge of the display region 50 that is closer to the electrode 31 side be Le, and let the voltage of the fixed-voltage power supply 10 be Vs, with the switching means 44 on, so that the electrode 31 is connected to the fixed-voltage power supply 10, and with the switching means 45 on, so that the electrode 32 is connected to ground (GND), the maximum voltage Vdymax in the Y direction in the display region 50 is expressed as Vdymax= Vs×Le/Ld.

Additionally, with the switching means 43 and the switching means 46 set to off, and the switching means 41, 42, and 47 set to the b side, the voltage gradient developed in the resistive film 30 is detected, via the resistive film 20, as a voltage (Vin) which corresponds to the pressed position.

Under the above-noted conditions, if the voltage VrefY of the reference voltage power supply 17 is set to be equal to the maximum voltage Vdymax in the display region 50, in the case in which the subregion 94 which is outside the display region is pressed, the condition Vin>VrefY exists, so that the voltage comparator 16 produces an output, the result being that an interrupt signal is input to the interrupt signal input terminal 12a of the CPU 12.

Because the CPU 12 can judge from this interrupt signal that the pressed position was outside the display region, there is no need for the CPU 12 to cause the A-D converter 11 to operate in order to perform a judgment of whether the pressed position was within the display region by means of the coordinate values that are obtained from the voltage value therefrom, thereby shortening the detection time.

Figure 6:
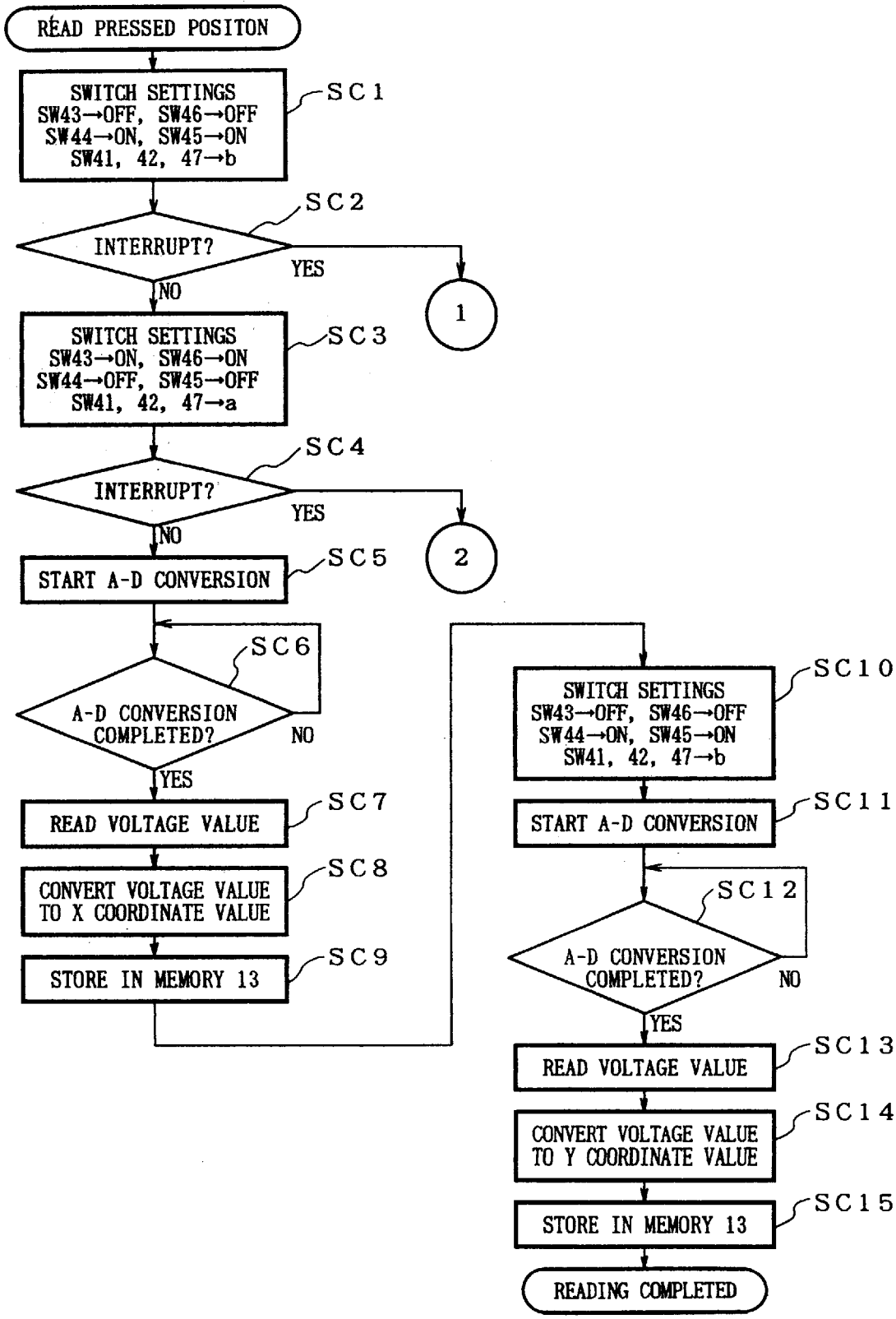
FIG. 6 is a flowchart which shows the operation of the third embodiment of the present invention, which is shown in FIG. 5.
Figure 7:
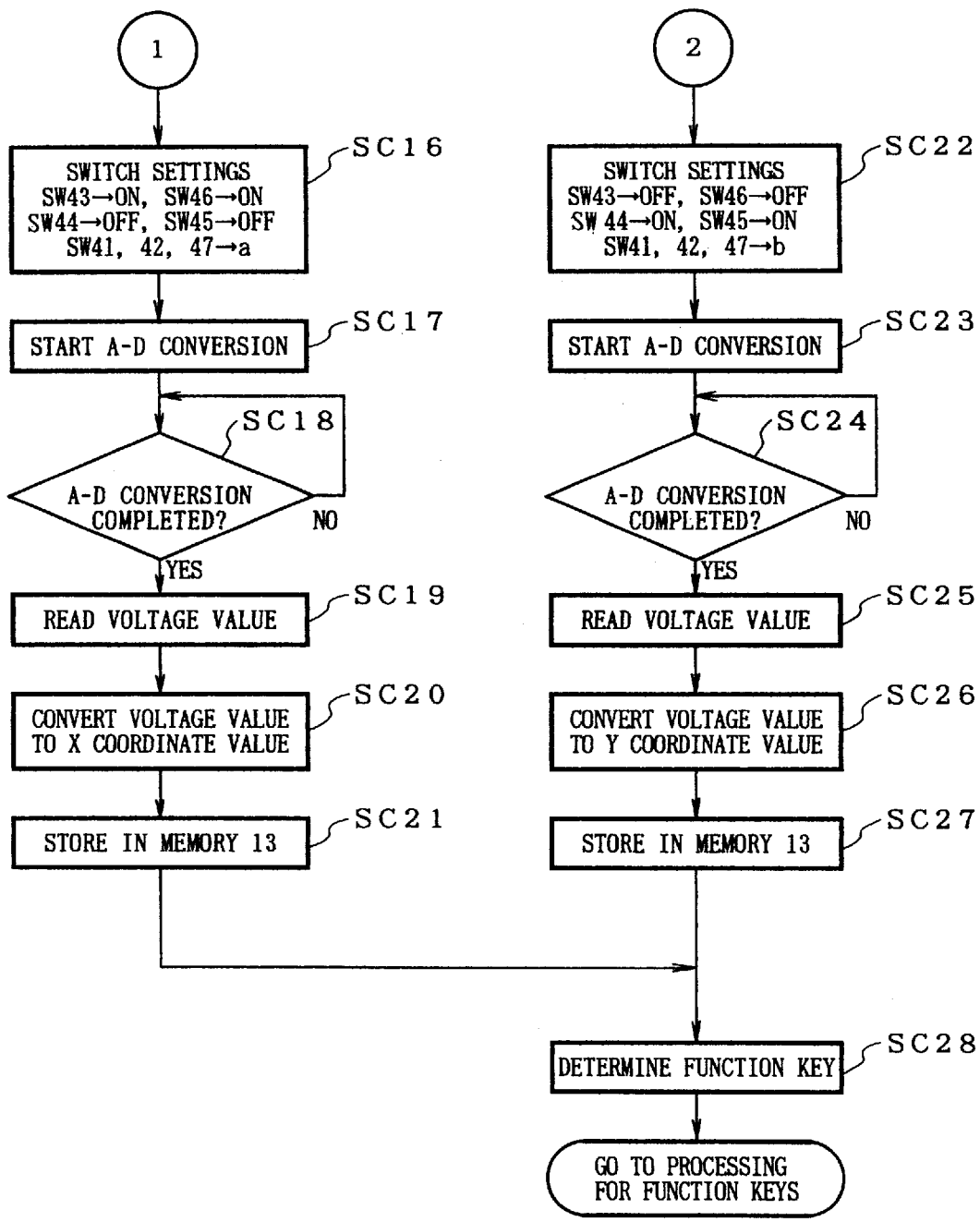
FIG. 7 is a flowchart which shows the operation of the third embodiment of present invention, which is shown in FIG. 5.
Figure 8:
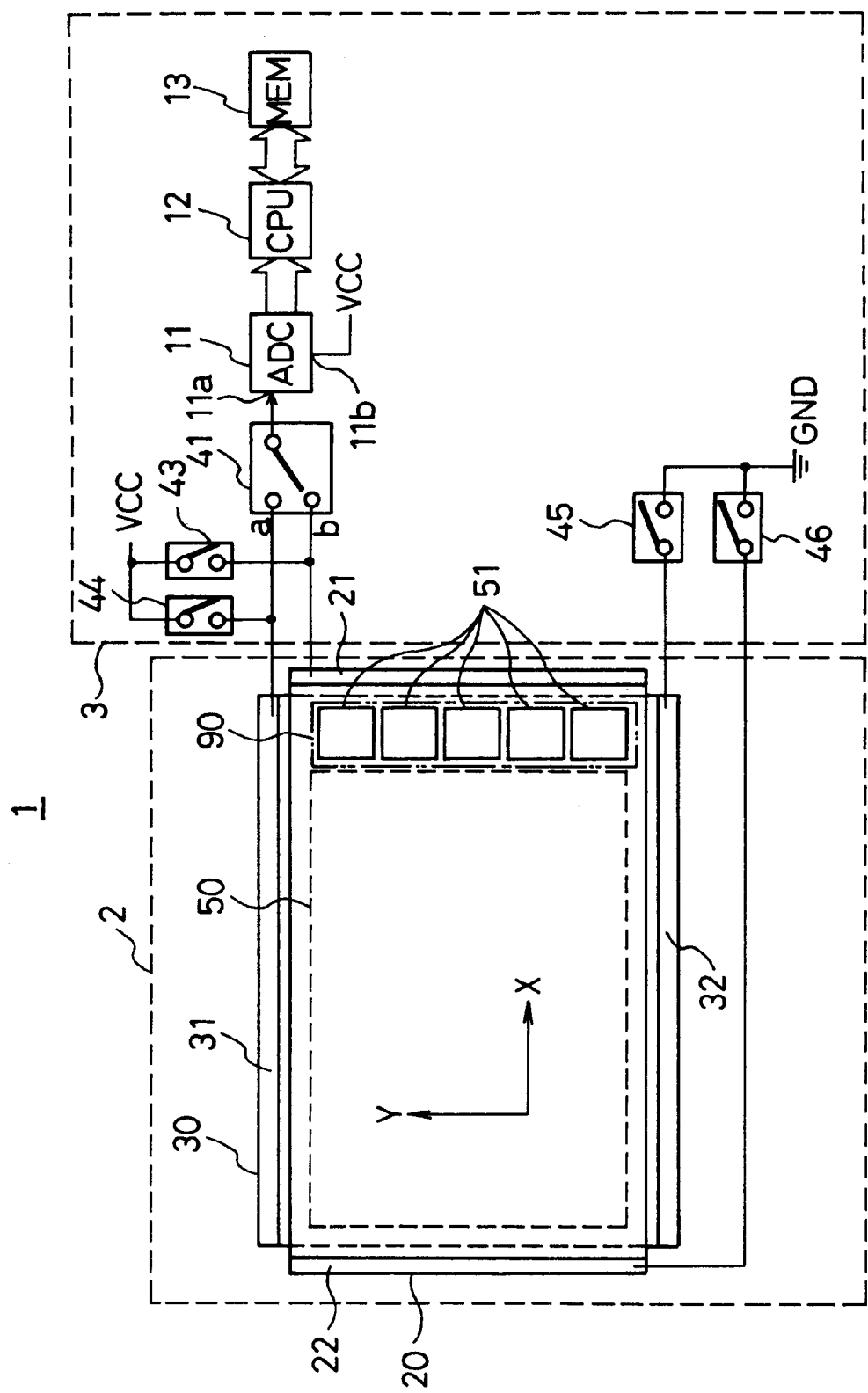
FIG. 8 is a block diagram which shows the configuration of example of a touch panel in the past.
Figure 9:
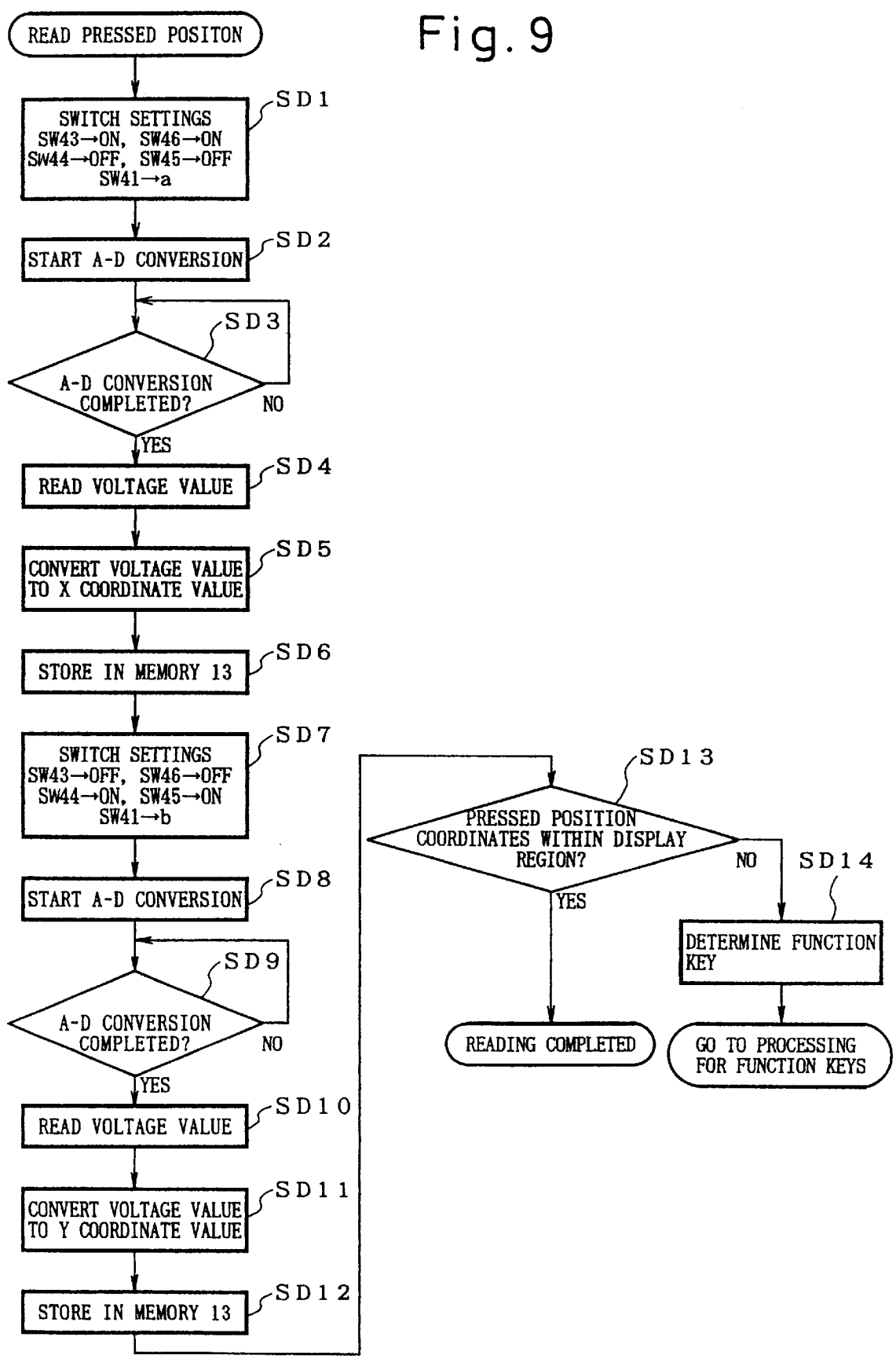
FIG. 9 is a flowchart which shows the operation of a touch panel of the past.

FIG. 6 and FIG. 7 are flowcharts which show the operation of the third embodiment of the present invention.

Specifically, first, to detect the region 94 outside the display region, the switching means 44 and switching means 45 are set to on, the switching means 43 and switching means 46 are set to off, and the switching means 41, 42, and 47 are connected to the b side (step SC1).

When this is done, if the pressed position is the subregion 94 which is shown is outside of the display region, the condition Vin>VrefY exists, the result being that the voltage comparator 16 produces an output, this causing an interrupt to the CPU 12 from the input terminal 12a thereof (step SC2).

Additionally, to read the coordinate value of the pressed position in the horizontal (X) direction, the switching means 43 and switching means 46 are set to on, the switching means 44 and switching means 45 are set to off, and the switching means 41, 42, and 47 are connected to the a side (step SC16).

The A-D converter 11 is instructed to start an A-D conversion (step SC17) and, when the A-D conversion is completed (step SC18), a voltage is read (step SC19), conversion is made from the voltage to a coordinate value (step SC20), and the results are stored in the memory 13 (step SC21).

Then, a judgment with regard to which region of the subregions 94 was pressed is made based on only the X coordinate value (step SC28), and processing for the corresponding function key is performed.

Next, in the case of the subregion 90 which is outside the display region, when the switching means 43 and switching means 46 are set to on, the switching means 44 and the switching means 45 are set to off, and the switching means 41, 42, and 47 are connected to the a side (step SC3), the Vin>VrefX condition exists, so that the voltage comparator 15 produces an output, this resulting in an interrupt being made to the CPU 12 from the interrupt input terminal 12a (step SC4).

Additionally, to read the coordinate value in the vertical (Y) direction, the switching means 44 and the switching means 45 are set to on, the switching means 43 and the switching means 46 are set to off, and the switching means 41, 42, and 47 are connected to the b side (step SC22).

The A-D converter 11 is instructed to start A-D conversion (step SC23) and, after the A-D conversion is completed (step SC24), a voltage value is read (step SC25), the voltage value is converted to a coordinate value (step SC26), and the results are stored in the memory 13 (step SC27).

Then, a judgment with regard to which region of the subregions 90 was pressed is made based on only the Y coordinate value (step SC28), and processing for the corresponding function key is performed.

In this manner, by directly judging that the pressed position is outside the display region by means of an interrupt signal derived from the output of a voltage comparator, there is no need for the CPU 12 to cause the A-D converter 11 to operate in order to perform a judgment of whether the pressed position was within the display region by means of the coordinate values that are obtained from the voltage value therefrom, thereby shortening the detection time.

In the above-noted flowchart, at step SC4 in the case in which neither region 90 nor 94 that are outside the display region, and a signal is input which indicates that a specific position in the display region 50 has been pressed, the processing between steps SC5 and SC15 is executed, this processing being substantially the same as the processing from step SA10 to SA20 in the flowchart of FIG. 2, the only difference being the switching of the switching means 42 and switching means 47 to the second switching means 41.

A touch panel according to the present invention, by virtue of adopting the above-described constitution, has a first effect of simplifying the processing to detect a function key outside of the display region of the touch panel. By doing this, not only is the time required for detection of a function key outside of the display region shortened, but also, in applications which require the continuous, high-speed detection of coordinates within the display region, such as for handwritten input, it is possible to reduce the overhead for the purpose of detecting the function keys outside of the display region.

The reason for this is that, before reading a coordinate by means of an A-D converter, comparison is performed between a detected voltage at the pressed position and the maximum voltage value in the display region, thus enabling judgment of whether the pressed position is outside or inside the display region.

A second effect of the present invention is that it is possible to prevent a decrease in the resolution per unit length within the display region that would have otherwise been caused by providing function keys outside the display region. By doing this, it is possible to attain the resolution required for processing such as processing of handwritten characters.

The reason for this is that, because judgment of whether the pressed position is inside or outside the display region is not made according to coordinate values, the A-D converter full-scale reference value being set as the maximum voltage value within the display region.

What is claimed is:

1. A resistive film type touch panel comprising two resistive-film sheets, which are disposed in opposition to one another with a minute spacing therebetween, said touch panel further comprising:

a prescribed power supply means, which is connected so as to generate a prescribed voltage gradient in a selected first resistive-film sheet, a second resistive-film sheet being provided for the purpose of detecting a voltage which corresponds to a pressed position on said touch panel;

a switching circuit;

a processing/control circuit;

an A-D conversion means; and a prescribed storage means, voltage information which corresponds to said pressed position coordinate values detected from said two resistive-film sheets being transferred via said switching circuit to said analog-digital conversion means, which is arbitrarily controlled by said processing/control circuit, determination being performed of said pressed position coordinate value, based on said voltage value, in said analog-digital conversion means, results of said determination being stored in said storage means, a display region and a non-display region outside said display region being formed on said touch panel, and a prescribed function key being disposed in said non-display region, said touch panel further comprising a non-display region pressing detection means which detects a pressing of said non-display region and a notification means which directly notifies said processing/control circuit of an output from said non-display region pressing detection means, without intervention of said analog-digital conversion means.

2. A touch panel according to claim 1, wherein notification of an output signal from said non-display region pressing detection means, which indicates that said non-display region has been pressed, is made to said processing/control circuit by using an interrupt signal.

3. A touch panel according to claim 1, wherein the non-display region at an edge part on a first coordinate axis of said touch panel has a side part which has a prescribed width and which is formed along said first coordinate axis, and a side part formed in parallel with a second coordinate axis, which is the other coordinate axis of said touch panel, and wherein when there is a detection of a pressing of said non-display region in the direction of said first coordinate axis, with regard to a voltage value for said first coordinate axis direction at said pressed position, no analog-digital conversion is performed, an analog-digital conversion being performed only with regard to a voltage value of the direction of said second coordinate axis at said pressed position.

4. A touch panel according to claim 3, wherein said non-display region is provided on both edges of said touch panel part in said first coordinate axis direction.

5. A touch panel according to claim 4, wherein said non-display region pressing detection means has threshold values that are mutually different from one another and that correspond to said non-display regions that are provided separately.

6. A touch panel according to claim 1, wherein said first resistive-film sheet is configured so that, at some point in time, it has a prescribed voltage gradient in a first coordinate axis direction and wherein said second resistive-film sheet is configured so that, at said point in time, it detects a voltage that corresponds to a pressed position in said first coordinate axis direction at said point in time, and further wherein at different point in time said second resistive-film sheet is so configured to form a prescribed voltage gradient in said second coordinate axis direction and while said first resistive film sheet is configured so that it detects a voltage that correspond to a pressed position in said second coordinate axis direction at said different point in time.

7. A touch panel according to claim 6, further comprising a first switching means, which selects one of the pair of said first and second resistive-film sheets and connects said selected resistive-film sheet to a power supply for the purpose of generating therein a prescribed voltage gradient, and a second switching means for the purpose of selecting one of the pair of said first and second resistive-film sheets for detection of a voltage value at the pressed position of said sheet, and connection to an analog-digital converter, said first and second switching means being operating in mutual synchronization.

8. A touch panel according to claim 1, wherein said display region is combined with an appropriate image display means or information input means, and wherein said non-display region has disposed on it a prescribed function key.

9. A touch panel according to claim 3, wherein said non-display region is provided on at least one of said first and second resistive-film sheets.

10. A touch panel according to claim 1, wherein a full-scale reference voltage value of said analog-digital conversion means is caused to coincide with a maximum voltage value in said display region.

11. A method for detecting a pressed position on a touch panel, said touch panel being a resistive film type touch panel comprising two resistive-film sheets, which are disposed in opposition to one another with a minute spacing therebetween, said touch panel further comprising a prescribed power supply means, which is connected so as to generate a prescribed voltage gradient in a selected first resistive-film sheet, a second resistive-film sheet being provided for the purpose of detecting a voltage which corresponds to a pressed position on said touch panel, a switching circuit, a processing/control circuit, an A-D conversion means, and a prescribed storage means, voltage information which corresponds to said pressed position coordinate values detected from said two resistive-film sheets being transferred via said switching circuit to said analog-digital conversion means, which is arbitrarily controlled by said processing/control circuit, determination being performed of said pressed position coordinate value, based on said voltage value, in said analog-digital conversion means, results of said determination being stored in said storage means, a display region and a non-display region outside said display region being formed on said touch panel, and a prescribed function key being disposed in said non-display region, said method comprising the steps of:

selecting a first resistive-film sheet and setting to the on condition a first switching means so as to connect to said first resistive-film sheet a prescribed power supply for the purpose of generating in said first resistive-film sheet a prescribed voltage gradient in a first coordinate axis direction;

setting of a second switching means to a prescribed condition, so as to connect said second resistive-film sheet to the analog-digital conversion means;

in a case in which a part of said touch panel is pressed, measuring a voltage which corresponding to said pressed position along said first coordinate axis of said touch panel;

in a non-display region pressing detection means, comparing a result of said measurement with a prescribed threshold value, in a case in which said measured voltage is higher than said prescribed threshold voltage or smaller than said prescribed threshold voltage, outputting a signal showing said non-display region pressing detection means which indicates that a position on the non-display region along said first coordinate axis has been pressed; and making notification of an output signal from said non-display region pressing detection means, via a notification means, directly to said processing/control circuit.

12. A method for detecting a pressed position on a touch panel according to claim 11 which, for the purpose of measuring a coordinate position value of said non-display region along said second coordinate axis, further comprises the steps of:

changing the connection condition of said first and second switching means so as to generate a prescribed voltage gradient in said second resistive-film sheet, and connecting said first resistive-film sheet to said analog-digital conversion means;

measuring a voltage value along a second coordinate axis with regard to said pressed position on said touch panel;

converting, in said analog-digital conversion means, said measured voltage value to a coordinate value on said second coordinate axis; and determining said pressed position on said non-display region from said coordinate axis value.

13. A method for detecting a pressed position on a touch panel according to claim 12, said method further comprising steps of:

selecting a prescribed function key based on a said determination of said pressed position in said non-display region, and executing prescribed processing of said selected function key.

* * * * *